Sept. 19, 1939.  A. E. SPINASSE  2,173,345
METHOD OF AND APPARATUS FOR PRODUCING SHEET GLASS OR PLATES
Filed Nov. 30, 1931   3 Sheets-Sheet 2

Inventor
Arthur E. Spinasse

Sept. 19, 1939.   A. E. SPINASSE   2,173,345
METHOD OF AND APPARATUS FOR PRODUCING SHEET GLASS OR PLATES
Filed Nov. 30, 1931   3 Sheets-Sheet 3
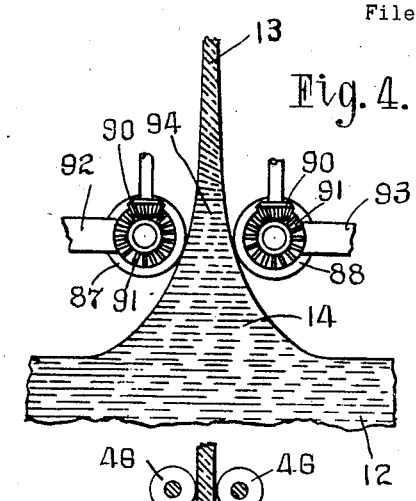
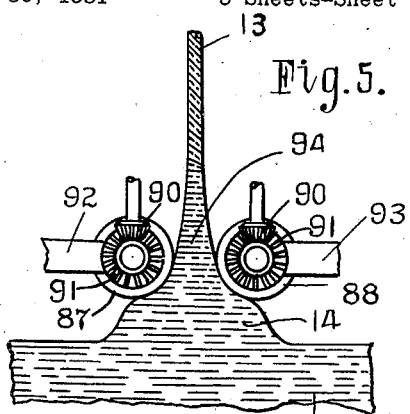
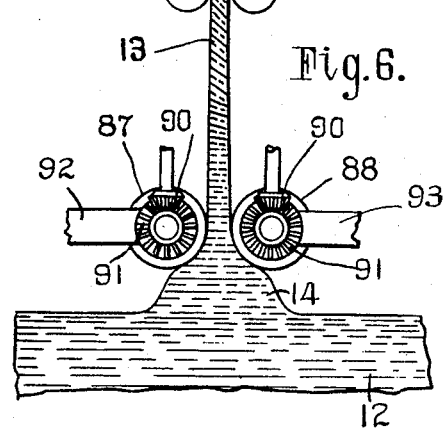
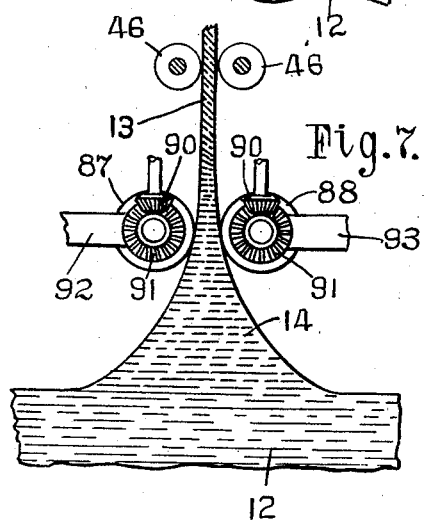
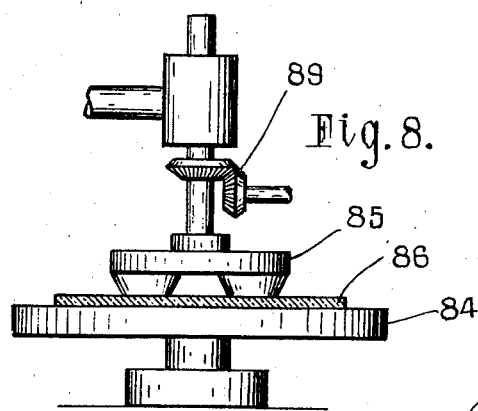
Inventor
Arthur E. Spinasse Patented Sept. 19, 1939

2,173,345

UNITED STATES PATENT OFFICE 2,173,345

METHOD OF AND APPARATUS FOR PRODUCING SHEET GLASS OR PLATES

Arthur E. Spinasse, Mount Vernon, Ohio

Application November 30, 1931, Serial No. 577,886

10 Claims. (Cl. 49—17)

The present invention relates to improvements in method of and apparatus for producing sheet glass or plates, and has for an object resemblance to the much more expensive plate glass and in which the sheet glass or plates will be substantially devoid of waves, lines or similar blemishes, and which sheet glass or plates will be entirely free from defects or blemishes such as caused by bending the relatively soft glowing sheet from a vertical to a horizontal course over bending rolls.

It is another object of the present invention to provide an improved method of and apparatus for the inexpensive production of commercial sheet glass or plates in competition with the plate glass, wherein the glass supplied to form the sheet will have a greater degree of flatness and uniformity of thickness and will be more homogeneous in texture, tough and strong and of good temper and transparency.

A further object of the invention is to provide an improved method of and apparatus with a view to materially increasing the speed of drawing or expedite production without impairing the qualities of the glass, and to greatly facilitate the production of large sheets of glass or plates of any desired thickness and so that, when desired, such sheets or plates may be further subjected to the grinding or polishing process with a saving of time, reduction in production cost, and with a minimum amount of breakage.

A further object of the present invention resides in providing an apparatus in which the parts are few and combined to save floor space, technical installation, and for successively acting upon the molten glass, meniscus and sheet to impart to the finished sheet qualities of plate glass which it has heretofore been impracticable to secure with prior method and apparatus for drawing sheets or plates wholly vertically from molten glass.

The foregoing and various other objects, also the new co-action between the parts and advantages of the invention will be more fully described and understood from the following detailed description of the preferred embodiment thereof and the improved method or process of practicing the invention, and will be more particularly pointed out in the claims appended hereto.

In the drawings, wherein like symbols refer to like or corresponding parts throughout the several views, Fig. 1 is a fragmentary vertical section taken through a melting tank furnace and apparatus constructed according to the present invention.

Figs. 4 to 8 illustrate modifications of the present invention.

Fig. 4 is a detail view in vertical transverse section illustrating a modification of planishing rolls above the bath and contacting lightly upon the surfaces of the glass for smoothing the surfaces of the sheet or plate.

Fig. 5 is a similar sectional view showing the planishing rolls spaced to partially reduce the thickness of the meniscus above the rolls.

Fig. 6 is a sectional view similar to Fig. 5 showing the rolls closer together to reduce the thickness of the meniscus beneath the rolls.

Fig. 7 is a sectional view similar to Fig. 4 with the rolls spaced higher on the forming sheet for light contact with the opposite surfaces of the upper portion of the meniscus near to where the sheet forms.

Fig. 8 is detail in side elevation of a polishing device that may be used for processing the sheet or plate.

Figure 1:
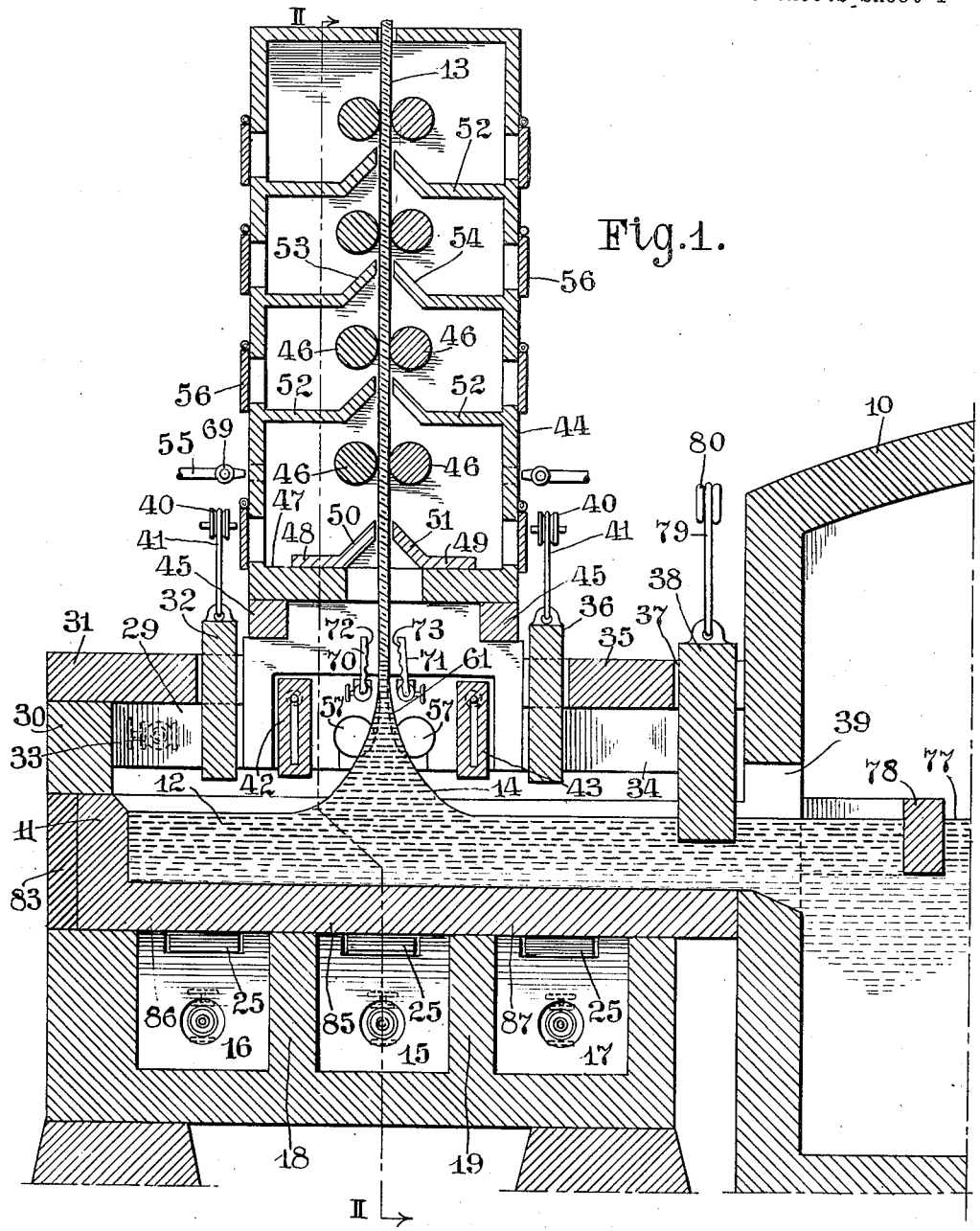

Referring more particularly to the drawings, 10 designates a glass melting tank furnace of conventional form, and 11 represents a shallow shoulder pot of clay communicating with the furnace 10 and for holding a shallow open bath of molten glass 12 received from the tank furnace from which to draw the sheet or plate of glass indicated at 13. The pot is adapted to receive a pool of glass preferably of substantially uniform depth and preferably anywhere from 6 to 12 inches deep, is closed at its front end and sides but with the rear end thereof open to the tank at the point of connection therewith as clearly shown in Fig. 1. The meniscus, wedge or blank is shown at 14 where the glass sheet issues from the free upper surface of the bath of glass in the shallow pot 11 at the drawing zone.

Below the pot 11 are disposed a number of independent heating chambers. In the embodiment shown in the drawings, three such chambers are provided, namely, a central chamber 15 located beneath the base of the meniscus of the glass sheet 13 and extending in line with and uninterruptedly throughout substantially the width of said pot and also two lateral heating chambers 16 and 17 which are separated from the central chamber 15 by the partitions 18 and 19.

Figure 2:
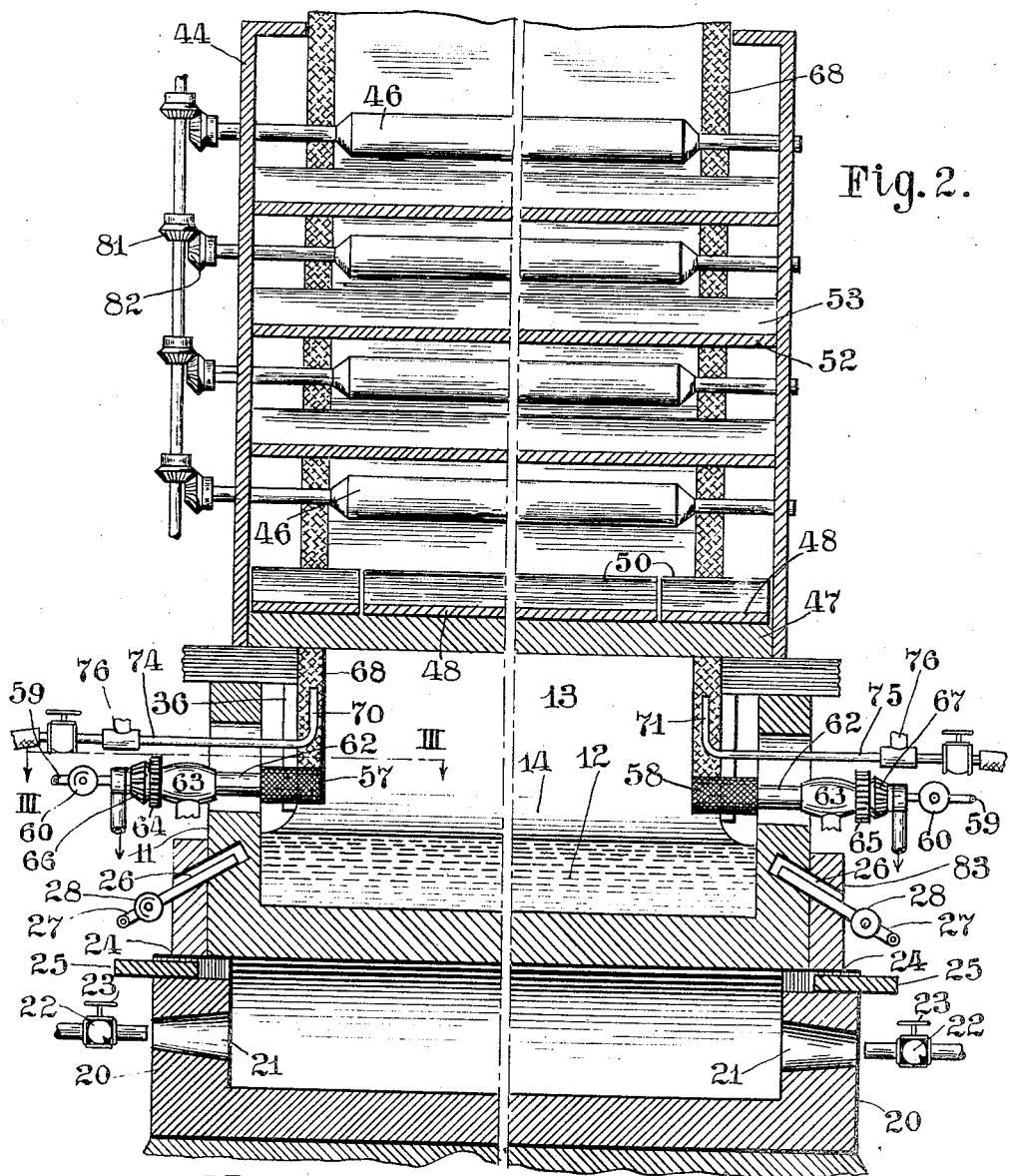
Fig. 2 is vertical section taken on the line II—II in Fig. 1.

As shown in Fig. 2, the end walls 20 of the chambers are each provided with ports or openings 21 and before these openings are the burner nozzles 22 having therein the controlling valves 23. The walls 20 terminate short of the bottom of the pot 11 and in the recesses 24 thus formed are placed the dampers 25. These dampers 25 are shiftable in and out in the recesses 24 to control the outlet of heat and hence the plasticity of the glass in the pot beneath the pairs of knurl rolls 57—57 and 58—58 for the sheet.

The bottom of the pot 11 forms the roofs 86, 85 and 87 of the independent temperature regulating chambers 15, 16 and 17 respectively. It will be observed from the drawings that aside from the front and side partition walls 18 and 19 which support the pot, there is no other support contacting with the pot bottom throughout the width thereof which otherwise would tend to cause local variations in temperature in the glass bath beneath the meniscus 14 which forms the sheet or plate glass 13 thereby causing thick and thin defects in the sheet. The partition walls 18 and 19 naturally tend to slightly lower the temperature of the glass in the pot but they are symmetrically mounted in substantially parallel relation and preferably stand in planes equally distant from the middle line of the meniscus thereby affording ample support for the pot while at the same time maintaining uniformity of temperature in the glass and speeding up the draw. When wider temperature controlling chamber or compartments are used the meniscus 14 which forms the sheet 13 may still be drawn from the glass along the middle line of chamber 15 but in spaced relation from the walls 18 and 19. This spacing may be equal or different at each side of the meniscus or the meniscus may be drawn nearer to walls 19 in order to compensate for any difference in the temperature of the glass which might exist between the forward and rear end of the pot 11. At times it may be found desirable to draw the meniscus 14 from the glass lying directly above either walls 19 or 18 and this is especially true in case four heating temperature controlling chambers are utilized in place of the three chambers shown in the drawings. These chambers may be in greater number and of any desired size or width, say anywhere from 12 to 30 inches in width and their length should substantially correspond to the full width of the pot or plate glass to be produced, that is anywhere between 60 to 120 or more inches in length; and with the present invention it is thought that sheets or plates of glass 200 or more inches in width may be successfully drawn. These transverse chambers may be separately heated at any desired temperature; some of the chambers may even remain unheated or be slightly cooled by circulating cooling air through the same. For example, while chambers 16 and 17 may each be suitably and independently heated to different temperature to obtain the desired resultant temperature of the glass in the pot thereabove at the sides of the meniscus 14, chamber 15 may remain unheated or air may be circulated therein to lower the temperature thereof when it is desired to increase the speed of the draw or for drawing very thick plates of glass, and relying on the adjoining chambers 16 and 17 to regulate the working temper or viscosity of the molten glass passing above chamber 15.

As also shown in Fig. 2, the side walls of the pot 11 are provided with recesses 26 extending to points adjacent to the glass bath near the sources of the edges of the sheet 13 being drawn and open outwardly to admit a fluid or temperature controlling medium therein such as air introduced through the pipes 27—27 under control of the valves 28—28.

In this manner the viscosity of the glass may be regulated at restricted points adjacent the side walls of the pot in line with the sheet or plate being drawn and assists in the formation of the sheet edges and maintaining the width of the sheet.

As shown in Fig. 1, housings extend above the pot 11. One of these housings includes the outer wall 29, the end walls 30 and roof 31. With the shield 32 these walls form a closed chamber into which a heating medium such as combustible gas may be introduced under control through the pipe or burner nozzle 33. The other housing is formed in part by the furnace wall, by the rear side walls 34, roof 35 and shield 36. The roof 35 is provided adjacent the furnace wall with an opening 37 into which extends an adjustable refractory damper 38 in position to regulate the heat issuing from the melting furnace through the opening 39.

This refractory damper may be raised and lowered by means of cable 79 and pulley 80 and may be maintained wholly spaced above the surface of the glass bath relying only upon the refractory float 78 to skim the upper layer of the glass. This refractory float may be omitted when desired.

The shields 32 and 36 extend in parallel and spaced relation above the bath at opposite sides of the drawing zone transversely of the pot and may be adjusted vertically to the desired position by means of pulleys 40—40 and cables 41—41 to regulate the temperature of the upper glass at the drawing zone. Within the space between the shields are located the adjustable coolers 42 and 43. Above the drawing zone is a vertical annealing leer 44 of any desired height upon the supports 45 and containing a vertical drawing machine comprising pairs of rolls 46—46 mounted in any desired number and about 12 inches apart one above another to form a continuous vertical passage for drawing the sheet 13 wholly vertically.

Upon oppositely disposed portions of floor 47 of the vertical leer are rows or series of metallic plates 48 and 49 preferably having upwardly inclined convergent lips 50 and 51 spaced apart at their near edges to form a slot through which the sheet 13 passes. These series of plates 48 and 49 are disposed transversely of the sheet on both sides thereof and may be independently adjustable as to positions toward and from the sheet to regulate the passage of the rising heat from the drawing zone at desired points in the leer and transversely of the sheet. In like manner the various floors 52—52 of the vertical leer are provided with the upwardly extending lips 53 and 54. These lips or series of plates are shown as extending beneath the drawing rolls and are intended to catch falling particles of the glass to prevent descent of the same into the glass bath. Such glass particles may be removed from the leer through doors 56. Pipes 55 with valve 69 may be used to supply additional heat in the leer.

Figure 3:
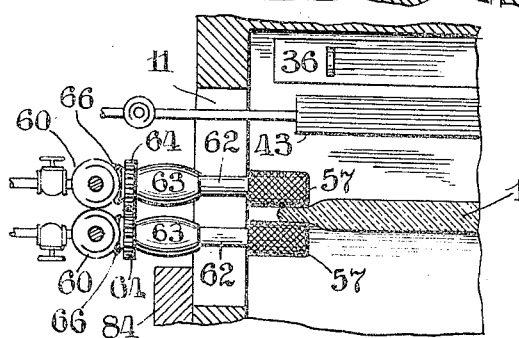
Fig. 3 is a horizontal section taken on line III—III in Fig. 2.

Border portions of the sheet 13 are received just above the glass bath by pairs of rolls 57—57, preferably knurled and hollow to receive through the pipes 59 under control of valves 60—60, cooling fluid. The knurled rolls are spaced appropriately apart to engage the meniscus 14 of the initially drawn border portions of the sheet or plate, and as shown by dotted lines in Fig. 1. Preferably the knurled rolls are intended to partially reduce the thickness of the meniscus creating thereabove a smaller meniscus 61 which draws upwardly into the finished edge or sheet border thickness. The rolls are intended to be rotated in relatively opposite directions, at any desired speed preferably at substantially the same or slightly lesser peripheral speed than that of the glass being drawn and in the same direction therewith in this manner the partially reduced meniscus border portions may be stretched to final thickness by the slightly faster upward movement of the sheet or plate. The knurl rolls are mounted upon shafts 62—62 journaled through bearings 63. Said shafts 62—62 are provided with the inter-meshing gears 64—64 and 65—65, as shown in Fig. 3. The pinions or gears are fast with the shafts and are fast to or made with the beveled pinions 66—66 and 67—67 which receive rotation from any appropriate source of power. One of the bearings 63—63 may be yieldingly mounted as it is well known in the art. Cooling water pipes 59 pass axially of the shafts 62. As shown in Fig. 2, the pairs of knurled rolls 57—57 and 58—58 impart to the border portions 68 of the sheet, a knurled condition. The surface portion of the rolls may be sufficiently smooth to allow for partial slipping action of the glass of the meniscus being drawn and shaped therebetween at the point of contact therewith. Any desired drawing force may be applied by the drawing rolls 46—46 to the border portions being drawn, such border portions being only slightly cooled and rolled down to the desired thickness by said rolls.

Just above the rolls 57—57 as shown in the views are disposed heating means. Such means preferably consist of pairs of upwardly extending pipes 70 and 71 having numerous perforations 72 and 73 disposed opposite the knurled border portions. Flames of burning gas are adapted to issue in minute jets or streams from said perforations. The pipe sections 70 and 71 are carried by the pipes 74 and 75 therein for controlling the flow of fuel to the burner orifices 72 and 73. The pipes are in communication with appropriate source of fuel supply and may be turned angularly in the sleeve 76 to adjust the upstanding ends or burners toward or from the knurled border portions 68 of the sheet or plate, and in this way the application of heat to the sheet borders and the ductility thereof may be regulated. The pipes 70 and 71 are also susceptible of a longitudinal or axial movement in the sleeves 76—76 to adjust the positions of the burner crosswise of the knurled border portions 68 or to remove the burners when desired.

At times these burners 70 and 71, also the anchorages formed by the use of pipes 27—27, valves 28—28 and recesses 26—26 may be omitted.

In certain instances, however, especially in connection with my improved temperature controlling chambers, my invention may be carried out with sheet bending rolls and also with an horizontal leer.

Insulation walls 83 and 84 surrounding the walls of pot 11 may be provided to prevent undue cooling of the glass along the front and side walls of said pot.

In operation the rear end portion of the melting tank furnace 10 is maintained at about 2600 degrees F. As the glass flows by gravity toward the front part of the tank it is gradually lowered in temperature to approximately 2000 to 2200 degress F. in the region of the float member 78, and as the glass passes to the shallow drawing pot 11 it is further lowered to about 1950 degrees F. in temperature for drawing. These temperatures in the front end of the tank and drawing pot may be varied somewhat depending to the composition of the glass, the speed of drawing, the thickness of the glass which is to be produced and in accordance to the observations by the operator in charge of the drawing kiln. Ordinarily, molten glass tends to devitrify if it is maintained below 1950 degrees F. and in a more or less stagnant state for a substantial length of time. It will be seen however, where the glass is to be formed into the sheet without much delay, as at the source of the meniscus 14, that the temperature of the glass may still be lowered below 1950 degrees F. while retaining the quality of the glass, and since the vertically drawn sheet with knurled borders can be produced at greater speed, the molten glass at the sheet source can still be lowered in temperature tending to further expedite production while retaining the quality of the glass. The sheet being drawn from the middle area of the glass pool. The drawing source is the critical region of the machine and operation and one aim of my invention is to permit the lowering of the drawing temperature of the glass in the draw pot as much as possible while retaining the quality of the glass and at the same time reducing and tempering the glass in the pot in advance of the draw such as will facilitate the draw and also produce a sheet or plate of good temper and texture. As an example chamber 17 may be kept at say approximately 1900 degrees F. so that the comparatively hotter glass passing in the pot thereabove from the tank furnace may be lowered to about 1950 degrees F. The chamber 16 may be maintained at say 1975 degrees F. to maintain the glass in the pot thereabove which tends to be cooler above the devitrification point while chamber 15 beneath the meniscus 14 may be maintained at say 1950 degrees F. The partial cooling of the meniscus and nascent sheet or plate being accomplished by means of conventional coolers 42 and 43. Of course, these local temperature changes may be varied independently from each other.

The working nature of the glass is mutable or changeful and may produce a hard brittle sheet occasioning serious loss of glass and the temper of the glass bath in the pot is better controlled and maintained as above described. Reducing heat passes to the glass through the pot bottom and this temperature in connection with the temperature controlling chambers, mollifies and improves the ductility and temper of the molten glass in the pot so that a homogeneous mass of glass at the right viscosity is constantly maintained in the draw pot which in turn permits and facilitates the drawing of relatively thick sheets or plates of say $\frac{1}{16}$ of an inch to $\frac{7}{8}$ of an inch in thickness of good quality and temper.

In starting the draw a well known form of bait is lowered between the draw rolls 46—46 which turn with the lowering of the bait until immersed in the glass bath. The motion of the rolls is then reversed and the sheet or plate of glass is drawn wholly vertically between draw rolls 46—46 and upwardly through the vertical annealing leer 44 until set. The sheet or plate may thus be cut in desired length as it emerges above the leer casing 44. The knurled rolls and partially cooled knurled border portions 68 of the initially forming sheet or plate expedite production and assist greatly in maintaining the sheet or plate flat and more or less taut during drawing.

The draw rolls may be covered with asbestos and the vertical leer 44 may be of any desired length. The sheet or plate may be substantially set when contacting with the first pair of draw rolls, but when desired, a first set of planishing rolls similar to rolls 46—46 preferably made of suitable smooth metal or steel, such as chrome steel or chromium plated rolls or nickel-chrome-molybdenum steel or like metal, the latter named being quite desirable on account of its elasticity, smoothness, and wear and heat resisting qualities, may be disposed beneath the floor 47 of the leer 44, that is nearer to or at the meniscus as to engage the still soft hot glass to shape or flatten the same. When desired, sections of such sheet or plate may be further treated with a slight degree of grinding, emerying or rouge polishing to produce commercial polished plates. The rolls 46—46 may be mounted as it is well known in the art so as to yield slightly against the glass to prevent undue pressure thereon and are rotated in the direction of movement of the sheet or plate by a source of power applied to the series of gears 81 and 82.

In Figs. 4 to 7 is shown the drawing of the meniscus 14 from the free surface of the glass bath 12. Planishing rolls 87 and 88 engage the surfaces of the free meniscus transversely of the sheet drawn by means of rolls 46—46. These planishing rolls may be maintained at any desired temperature as is well known in the art and have horizontal shafts provided with miter gears 91 operated by other gears 90 on shafts extending at right angle to said horizontal shafts. Suitable power being applied to the last named shafts to cause rotation of the planishing rolls at the desired speed when in contact with the glass to form or planish the surfaces or sides of the glass being drawn. Supports 92 and 93 are provided for the planishing rolls so that they may be maintained in desired spaced relation for desired formative or planishing effect upon the glass meniscus being drawn. These planishing rolls may be otherwise arranged as above described in connection with the drawing rolls 46—46. In Fig. 4, the planishing rolls are spaced apart to engage the hot soft meniscus about half way between the upper and lower portion thereof to planish the surfaces being drawn and the upper portion 94 of the meniscus is then drawn to final thickness with smooth planished surfaces.

In Fig. 5 the planishing rolls are shown spaced closer together to form a secondary meniscus 14 in reduced thickness, while in Fig. 6 these rolls are set still closer together to further reduce the thickness of the meniscus to substantially the finished thickness of the sheet. In Fig. 7 the planishing rolls are shown to engage the upper portion of the meniscus. It will be understood that the rolls 46—46 engage the glass where it is set to draw the sheet and the planishing rolls 87—88 engage the glass where it is soft or formable.

A means for performing the polishing operation is illustrated in Fig. 8, where the character 84 designates a usual polishing table or support for a section of the drawn glass 86 cut from the sheet 13 as hereinbefore described. Ordinary grinding or polishing runners or shoes as indicated at 85 are in contact with the surface of the glass section to be polished, said runners or shoes being connected to the end of a vertical shaft provided with a miter gear operated by another miter gear 89 on a shaft extending at right angle to said vertical shaft.

Suitable power being applied to said last named shaft to operate the runners or shoes with the usual grinding and polishing materials upon the section of drawn sheet glass during the grinding or polishing treatment. Much saving in the grinding and polishing process is thus accomplished.

From the foregoing it will be observed that the molten glass is constantly supplied from a melting furnace into a shallow pot or receptacle, co-acting means being provided for drawing the sheet or plate wholly vertically from the free open surface and middle portion of the shallow glass bath in the pot so that there will be a substantially quiescent pool of glass extending a substantial distance at the front and rear side of the meniscus which forms the sheet. The sheet or plate is drawn wholly vertically through a vertical drawing machine and annealing leer until set while at the same time the cooling knurled rolls act upon the border portions only of the forming sheet or plate to shape said border portions and maintain the desired width of the sheet. The individual chambers for applying heat under control beneath the drawing pot regulates the ductility and tractability of the plastic glass in the pot and hence that of the glass being drawn into the sheet and that of the glass portions which pass between the knurled rolls.

In drawing the sheet or plate wholly vertically, bending rolls and hence contact of the soft glowing drawn glass in contact therewith is avoided and the sheet or plate in the process of drawing may come in contact with the first pair of drawing rolls at a much lower temperature tending to preserve the quality of the glass. Blemishes such as created by the so-called Fourcault slotted shaping "deputer" process of drawing glass are avoided.

Also in dispensing with such slotted deputer or other refractory bars or like refractory bodies immersed in the glass adjacent the source of drawing the cost of installation is reduced. The combination and coaction of the parts as herein shown and described result in a more rapid manufacture of the sheet or plate than heretofore and a sheet or plate of better quality, flatness and uniformity of thickness.

What I claim is:

1. The process of producing a sheet or plate of glass, which consists in drawing a sheet or plate of glass from the free surface of a shallow pool of glass, independently applying a temperature controlling medium to the bottom of the pool beneath the meniscus of the sheet or plate being drawn at a predetermined glass melting temperature, independently maintaining the forward bottom portion of the pool of glass at a relatively higher temperature, and independently maintaining the rear bottom portion of the pool of glass at a relatively higher temperature than at the glass of the pool beneath the meniscus during the drawing operation.

2. The process of drawing a sheet or plate of glass, which consists in drawing the sheet or plate from the free surface of a pool of glass, and independently applying a temperature affecting medium of different temperatures upon different particular individual bottom portions of the pool of glass and independently applying a temperature affecting medium to the portion of the pool which lies directly beneath the meniscus of the sheet being drawn at a lower temperature than that of the remaining portion of the pool.

3. In the art of producing sheet or plate glass with a shallow pot connected to a melting tank and an independent temperature controlling chamber beneath the drawing area in the middle part of the pot together with one of such chambers beneath the pot at each side of the drawing area, one positioned beneath the forward end of the pot and the other positioned between the drawing area and the melting tank, the process which consists in supplying molten glass from the melting tank to said shallow pot above said chambers, drawing the sheet or plate vertically from the glass lying in the pot above the middle chamber, maintaining the chamber beneath the drawing area at a predetermined temperature for drawing the sheet, maintaining the forward chamber beneath the pot at a relatively higher temperature than in the middle chamber, and maintaining the chamber which lies between the drawing area and melting tank at a relatively lower temperature than in the forward chamber during the drawing operation.

4. The process of drawing a sheet or plate of glass, which consists in forming a pool of molten glass into a receptacle, drawing a sheet or plate from said pool of molten glass, independently applying heat externally upon the bottom portions of the receptacle at each side of the meniscus which forms the sheet or plate, and independently applying a temperature affecting medium to the bottom portion of the receptacle which lies directly beneath and in line with the meniscus which forms the sheet or plate at a relatively lower temperature during the drawing of the glass sheet or plate.

5. The process of drawing a sheet or plate of glass, which consists in drawing the sheet or plate from the free surface of a shallow pool of molten glass in a receptacle, independently applying heat under control to the external bottom portion of the receptacle at each side of the meniscus being drawn which forms the sheet or plate, and independently applying a temperature affecting medium to the portion of the bottom of the receptacle which lies directly beneath and in line with the meniscus which forms the sheet or plate free from additional external application of heat during the drawing operation of the sheet.

6. The process of producing a sheet or plate of glass with a shallow pot connected to a glass melting tank, which consists in flowing a shallow pool of glass to the pot from said tank, drawing a sheet of glass upwardly from said pool, rolling down and partially cooling the border portions of the meniscus which forms the sheet while freely stretching said border portions until the glass sheet is set independently applying a temperature affecting medium to the glass bottom of the pool beneath the meniscus and border portions of the forming sheet at the desired temperature, independently externally applying heat at a predetermined glass melting temperature upon the rear bottom portion of the pot between the drawing area and the melting tank, and independently externally applying heat upon the forward bottom portion of the pot but to a higher degree than upon the rear bottom portion of the pot during the drawing operation of the sheet.

7. In a machine for drawing continuous sheet of glass, the combination with a melting tank, of a shallow pot mounted to receive a shallow pool of molten glass from said tank, a vertical leer overhanging said pot, vertical drawing means disposed in said leer for continuously drawing the sheet from the surface of said pool upwardly through said leer, pairs of edging rolls disposed for engaging and spaced apart sufficiently for only partially reducing the temperature and thickness of the drawn meniscus which forms the sheet, the drawing means engaging the sheet transversely thereof so that the forming border portions of the sheet above said rolls will be free to admit for the free stretching thereof until the sheet is set, means for tempering the drawing area, a separate individual chamber for externally applying heat to the middle bottom portion of the pot beneath the meniscus, and separate individual chambers for externally applying heat to the rear and forward bottom portion of the pot during the drawing operation.

8. The process of drawing a sheet or plate of glass, which consists in drawing a continuous plate of glass from the free surface of a shallow pool of molten glass in a shallow pot free from submerged clay body within the glass pool beneath the plate of glass being drawn, independently applying heat externally to the pot bottom beneath and at the sides of the meniscus which forms the sheet to temper the glass and regulate the temperature of the pool, partially rolling down and partially cooling the rising border portions of the meniscus which forms the glass plate, subsequently independently applying both softening heat to the partially reduced meniscus and tension longitudinally to said border portions and stretching said heated border portions to final thickness while at the same time maintaining said rising border portions free from contact with mechanical gripping means during the stretching action of said border portions and before the plate being drawn is set, annealing the plate as it is being drawn, and maintaining the plate vertical and free from bending throughout the drawing operation.

9. The process of producing sheet or plate of glass, which consists in drawing the sheet from the free surface of a shallow pool of glass in a pot, independently maintaining the temperature of pot beneath the meniscus of the forming sheet at about 1950 deg. F., independently maintaining the forward portion of the pot at about 1975 deg. F., and independently maintaining the rear portion of the pot at about 1900 deg. F., substantially as described.

10. The process of producing sheet or plate of glass, which consists in drawing the sheet from a shallow pool of glass in a pot connected to and fed with glass from a melting tank, independently heating the rear and forward portion of the pot bottom at desired glass melting temperature and independently heating the bottom of the pot beneath the meniscus forming the sheet transversely of the sheet at a temperature below that of the forward bottom portion of the pot.

ARTHUR E. SPINASSE.